(12) United States Patent
Ebenezer et al.

(10) Patent No.: US 6,359,121 B1
(45) Date of Patent: Mar. 19, 2002

(54) REACTIVE DYES CONTAINING A LINKAGE

(75) Inventors: Warren James Ebenezer, Stockport; Donna Maria Mynett, Newcastle-U-Lyme, both of (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/744,254

(22) PCT Filed: Jul. 26, 1999

(86) PCT No.: PCT/GB99/02447
§ 371 Date: Jan. 31, 2001
§ 102(e) Date: Jan. 31, 2001

(87) PCT Pub. No.: WO00/08104
PCT Pub. Date: Feb. 17, 2000

(30) Foreign Application Priority Data

Jul. 31, 1998 (GB) .............................. 9816780

(51) Int. Cl.[7] .......................... C09B 62/09; D06P 1/382
(52) U.S. Cl. ...................... 534/634; 534/605; 534/612; 8/549
(58) Field of Search ................. 534/605, 612, 534/634; 8/549

(56) References Cited

FOREIGN PATENT DOCUMENTS

| DE | 2 001 960 | 7/1970 |
|---|---|---|
| EP | 0 458 743 | 11/1991 |
| EP | 0 625 551 | 11/1994 |
| EP | 0 818 513 | 1/1998 |
| WO | WO 93/18224 | 9/1993 |

OTHER PUBLICATIONS

Patent Abstracts of Japan, vol. 012, No. 015, Jan. 16, 1988, JP 62–172062, Jul. 29, 1987.

*Primary Examiner*—Fiona T. Powers
(74) *Attorney, Agent, or Firm*—Oblon, Spivak, McClelland, Maier & Neustadt, P.C.

(57) ABSTRACT

A reactive disazo dye of the formula (I) $D^1—Y—D^2$ wherein each of $D^1$ and $D^2$ is a chromophore of the formula (II)

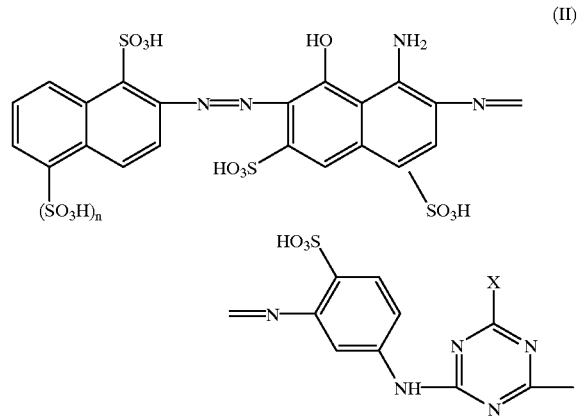

in which X is fluorine, chlorine or optionally substituted pyridinium, an $SO_3H$ is present in the 5-or 6-position of the naphthalene nucleus, n is 0 or 1, and Y is a bridging group or a sulphonic acid salt of the dye of formula (I). The dyes may be used for dyeing, printing or ink-jet printing, for example, of textile materials and paper and are particularly valuable for coloring cellulosic textile materials.

9 Claims, No Drawings

REACTIVE DYES CONTAINING A LINKAGE

This application is a 371 of PCT/GB99/02447 Jul. 26, 1999.

This invention relates to reactive dyes having a bridging group between triazinylamino groups each attached to a chromophore.

GB-A-1283771 and EP-A-0625551 disclose respective general ranges of reactive dyes of the formula (A)

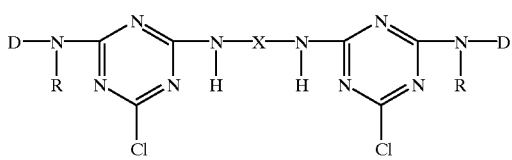

(A)

where D is a chromophore (which in the case of GB-A-1283771 is specifically a naphthylazo-phenylene or -naphthalene containing at least 3 sulphonic acid groups and in the case of EP-A-0625551 is any of a wide range of chromophores), R is H or an optionally substituted $C_{1-4}$ alkyl group and X specifically a linking group which, in the case of GB-A-1283771, is an aromatic group selected from phenylene, diphenylene and naphthalene nuclei, and in the case of EP-A-0625551 is an aliphatic linking group, the group —NHXNH— forming a bridging group between receptive triazine nuclei. The dyes of GB-A-1283771 offer a degree of fixation over a wide range of liquor to goods ratios and provide shades of very good light fastness, while those of EP-A-0625551 show good fastness and build up properties.

JP-A-62-172062 discloses a wide range of dyestuffs in which chromophores are linked by the specific group

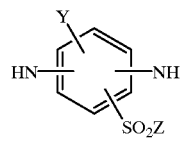

wherein Y is hydrogen, halogen or alkyl and Z is the reactive group —CH=$CH_2$ or —$CH_2CH_2OSO_3H$.

One of many examples of dyes disclosed has the following formula

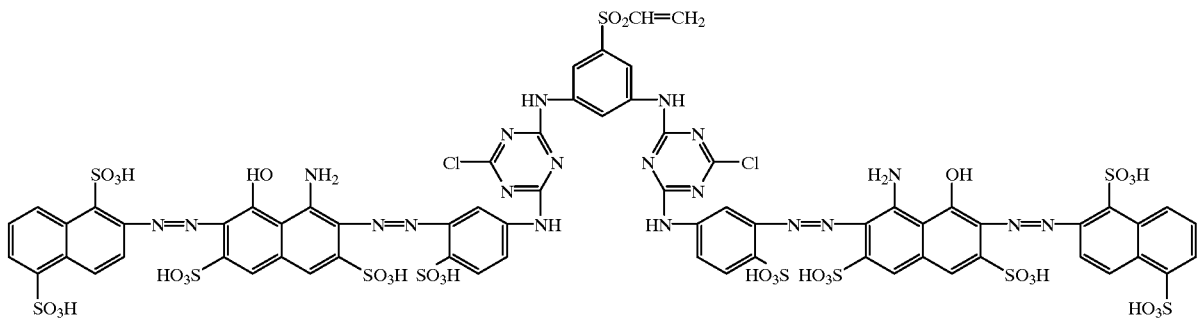

In our WO-A-99/05224, we describe a range of dyes in which the bridging group is derived from an aminoalkyl piperazine, which dyes have the formula (B)

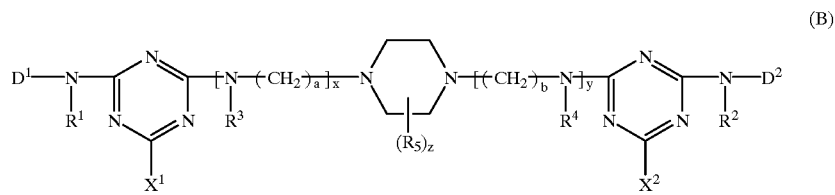

(B)

wherein:
each of $R^1$, $R^2$, $R^3$ and $R^4$, independently, is H or an optionally substituted alkyl group;
each of $X^1$ and $X^2$, independently, is a labile atom or group;
each of x and y, independently, is 0 or 1 and at least one of x and y is 1;
each of a and b, independently, is 2 to 5;
z is zero or is 1 to 4; and when each of x and y is 1, a>b;

the or each $R^5$, independently, is alkyl; and each of $D^1$ and $D^2$, independently, is a monoazo or polyazo chromophore, or a metallized derivative thereof.

We have found surprisingly that if, in dyes of the above formula (A), the chromophore D is a particular disazo dye, defined below, then such dyes, especially when used for exhaust dyeing of cellulosic materials, can exhibit excellent all-round fastness properties and build-up and compatibility with other dyes whose preferred exhaust temperature is 80° C. or, more preferably, above.

Thus, according to one aspect, the invention provides a dye of the formula (I)

wherein each of $D^1$ and $D^2$ independently is a chromophore of the formula

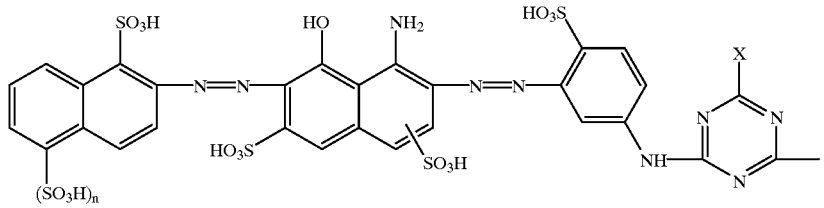

in which

X is fluorine, chlorine or optionally substituted pyridinium;

an $SO_3H$ is present in the 5- or 6-position (preferably the 6-position) of the naphthalene nucleus;

n is zero or 1 (preferably 1); and

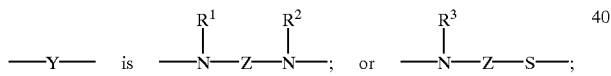

in which

Z is a $C_{5-12}$ aliphatic or aromatic cyclic hydrocarbon group, optionally additionally containing at least one hetero atom selected from N, O and S and optionally substituted by at least one of $C_{1-4}$ alkyl and $SO_3H$ (or a salt thereof); or at least two said cyclic hydrocarbon groups linked together; or a $C_{1-15}$ alkylene or $C_{2-15}$ alkenylene chain, which said chain (a) optionally additionally contains, so as to be interrupted or terminated by, at least one of (1) at least one hetero atom selected from N, O and S and (2) at least one $C_{5-12}$ aliphatic or aromatic cyclic hydrocarbon group, which said cyclic hydrocarbon group optionally additionally contains at least one hetero atom selected from N, O and S and is optionally substituted by at least one of $C_{1-4}$ alkyl and $SO_3H$ (or a salt thereof); and (b) is optionally substituted by $C_{1-4}$ alkyl, hydroxy-$C_{1-4}$ alkyl, amino-$C_{1-4}$ alkyl, hydroxyl, carboxyl or amino, which amino group or moiety is optionally substituted by one or two $C_{1-4}$ alkyl groups, or by a substituent group which, together with (i) one of $R^1$, $R^2$ and $R^3$ (each defined below), (ii) the nitrogen atom to which $R^1$, $R^2$ or $R^3$ is attached and (iii) a chain length of Z between the said nitrogen and the substituent group, forms a heterocyclic group; and each of $R^1$, $R^2$ and $R^3$, independently, is hydrogen, a $C_{1-4}$ alkyl, hydroxy-$C_{1-4}$ alkyl or amino-$C_{1-4}$alkyl group or each of $R^1$ and $R^2$, together with the respective nitrogen atoms to which they are attached and the chain Z therebetween, forms a heterocyclic group or (as defined above) one of $R^1$, $R^2$ and $R^3$, together with (i) the nitrogen atom to which it is attached, (ii) the said substituent group on the chain Z and (iii) the said chain length between the said nitrogen atom and the said substituent group, forms a heterocyclic group; and Y is other than

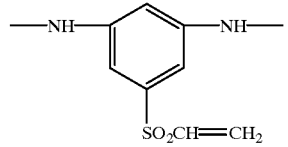

(and preferably contains no reactive group); or a sulphonic acid salt of the said dye of the formula (I).

When X is a substituted pyridinium, preferred substituents are 3-carboxyl, 3-carbonamido and 4-carboxyl.

In one preferred range of dyes, Z is a $C_{1-10}$ alkylene chain optionally substituted by at least one group selected from $C_{1-4}$ alkyl, hydroxy and carboxyl. Such chains may be free from any hetero atom or may contain additionally at least one hetero atom selected from O and N. More preferably, the chain is a $C_{2-8}$-alkylene chain which is unsubstituted or substituted by at least one group selected from methyl, hydroxy and carboxyl. Still more preferably the chain is of the formula

wherein x is 2 or 3, which alkylene chain is unsubstituted or substituted by one or two methyl groups or a hydroxy or carboxyl group and each of $R^1$, $R^2$ and $R^3$ independently is selected from hydrogen, $C_{1-4}$ alkyl and hydroxyethyl.

Examples of the group Y in which Z is a $C_{1-10}$ alkylene chain optionally substituted by at least one of $C_{1-4}$ alkyl, hydroxy and carboxyl are $HNC_2H_4NH$; $HNC_3H_6NH$; $HNC_4H_8NH$; $HNC_5H_{10}NH$; $HNC_6H_{12}NH$; $HNC_8H_{16}NH$; $HNC_2H_4N(CH_3)$; $HNC_3H_6N(CH_3)$; $HNC_2H_4N(C_2H_4OH)$; $HNC_2H_4N(C_3H_6OH)$; $HNC_3H_6N(C_2H_4OH)$; $HNC_2H_4N(C_2H_5)$; $HNC_2H_4N(n-C_3H_7)$; $HNC_3H_6N(C_2H_5)$; $HNC_3H_6N$ (n-C$_3$H$_7$); (H$_3$C)NC$_2$H$_4$N(CH$_3$); (H$_3$C)NC$_3$H$_6$N(CH$_3$); (H$_3$C)NC$_2$H$_4$N(C$_2$H$_5$); HNC$_2$H$_4$NH[CH(CH$_3$)$_2$]; (H$_5$C$_2$)NC$_2$H$_4$N(C$_2$H$_5$); HNC$_2$H$_4$NH[CH(CH$_3$)(C$_2$H$_5$)]; HNC$_2$H$_4$N(n-C$_4$H$_9$); HNC$_2$H$_4$N[CH$_2$CH(CH$_3$)(OH)]; HNCH(CH$_3$)CH$_2$NH; HNC(CH$_3$)$_2$CH$_2$NH; HNCH$_2$CH(OH)CH$_2$NH; HNCH$_2$C(CH$_3$)$_2$CH$_2$NH; HNCH(C$_2$H$_5$)CH$_2$NH; HNCH$_2$CH(CH$_3$)C$_3$H$_6$NH; HNCH$_2$CH(CH$_3$)N[CH(CH$_3$)$_2$]; NHCH$_2$C(CH$_3$)$_2$CH[CH(CH$_3$)$_2$]NH; HNC$_2$H$_4$S and HNCH(CO$_2$H)CH$_2$S.

Examples of the group Y in which Z is a C$_{1-10}$ alkylene chain additionally containing a hetero atom are HNC$_3$H$_6$N(CH$_3$)C$_3$H$_6$NH; HNC$_2$H$_4$OC$_2$H$_4$OC$_2$H$_4$NH; and HNC$_2$H$_4$OC$_2$H$_4$NH.

The C$_{1-10}$ alkylene chain of Z may additionally contain an aliphatic or aromatic ring structure and examples of the group Y in which Z is such a chain are:

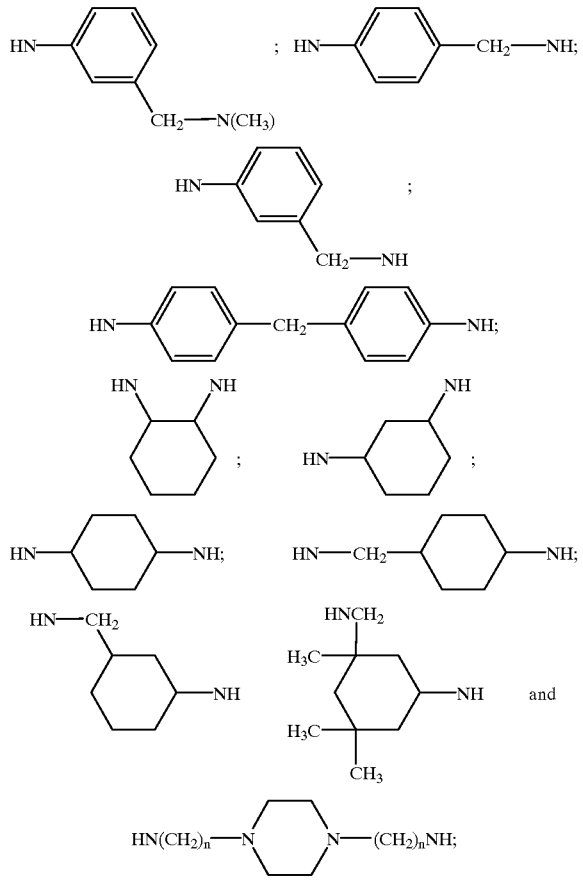

where n is 2 or 3, which is an example of the group Y in which Z is C$_{1-10}$ alkylene chain interrupted by an aliphatic ring containing at least one hetero atom. Of these groups,

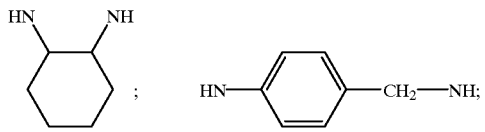

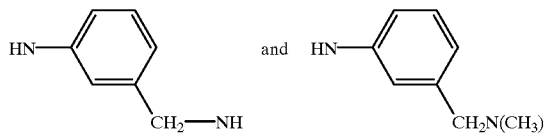

are especially preferred.

Especially preferred examples of the group Y in which Z is a C$_{1-10}$ alkylene chain are NHC$_2$H$_4$NH; NHC$_3$H$_6$NH; NHCH(CH$_3$)CH$_2$NH; NHC$_2$H$_4$N(CH$_3$); NHC$_3$H$_6$N(CH$_3$); NHCH$_2$CH(OH)CH$_2$NH; NHC$_2$H$_4$N(C$_2$H$_4$OH); NHC(CH$_3$)$_2$CH$_2$NH; NHC$_3$H$_6$N(C$_2$H$_4$OH); NHC$_2$H$_4$S; NHC$_2$H$_4$N(C$_2$H$_5$), $_{N(CH3)}$C$_2$H$_4$N(CH$_3$); NHC$_3$H$_6$N(C$_3$H$_7$); N(C$_2$H$_4$OH)C$_2$H$_4$N(C$_2$H$_4$OH); HNCH(CO$_2$H)CH$_2$S; N[CH(CH$_3$)$_2$]CH(CH$_3$)CH$_2$NH; HNC$_6$H$_{12}$NH; HNC$_3$H$_6$N(CH$_3$)C$_3$H$_6$NH; HNC$_2$H$_4$OC$_2$H$_4$NH; and HNC$_2$H$_4$OC$_2$H$_4$OC$_2$H$_4$NH.

In another preferred range of dyes, Z is a phenylene group, optionally substituted by a sulphonic acid group or one or more methyl group(s). Examples of the group Y in which Z is a phenylene group are:

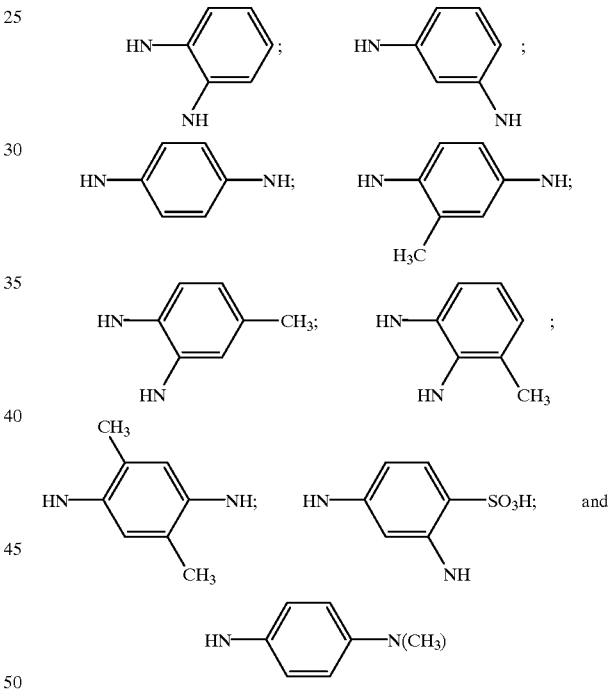

or mixtures thereof, for example, a mixture of

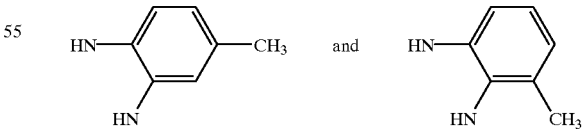

In yet another preferred range of dyes Z is a C$_{1-15}$ alkylene chain and is substituted by a substituent group, preferably a C$_{1-10}$ alkylene group, which, together with (i) one of R$^1$, R$^2$ and R$^3$, (ii) the nitrogen atom to which R$^1$, R$^2$ or R$^3$ is attached and (iii) a chain length of Z between the said nitrogen atom and the substituent group, forms a heterocyclic group. More preferably, the C$_{1-15}$ alkylene chain is interrupted by a nitrogen atom which carries the substituent group, for example, in the case where Y is an imino-$C_{14}$ alkylpiperazinyl group. Examples of Y in which the group Z includes a heterocyclic ring formed in this manner are:

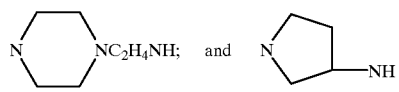

In another preferred range of dyes, each of $R^1$ and $R^2$, together with the respective nitrogen atoms to which they are attached and the chain Z therebetween, form a heterocyclic group, more preferably a piperazine group.

A dye of the formula (I), given and defined above, can be prepared by a method aspect of the invention, which method comprises allowing at least one reactive disazo dye of the formula (II)

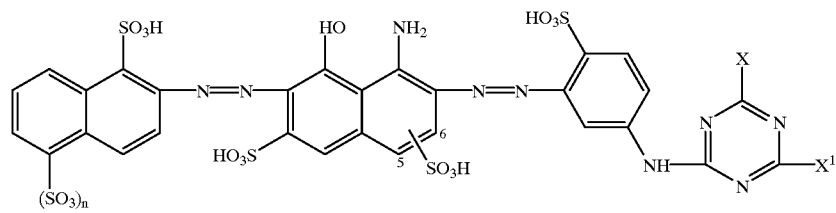

wherein X and n are as defined above and $X^1$ is a fluorine, chlorine or optionally substituted pyridinium group, to react with a diamine or thioamine of the formula

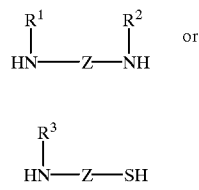

wherein each of $R^1$, $R^2$, $R^3$ and Z is as defined above, at a pH of from 7 to 10, in a proportional amount of two moles of reactive disazo dye (II) per mole of diamine or thioamine (III) or (IV). The reaction may take from 1–12 hours.

The reactive disazo dye of the above formula (II) can be prepared by reacting a disazo dye of the formula (V)

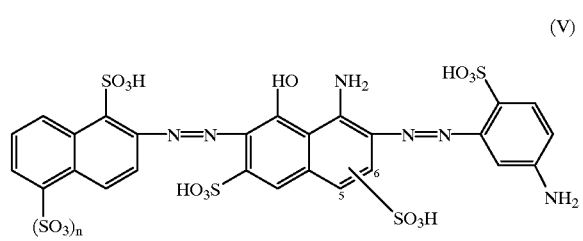

with a triazine of the formula

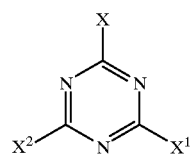

wherein each of X $X^1$ and $X^2$ independently is chlorine, fluorine or optionally substituted pyridinium.

The disazo dye of the formula (V) may be prepared by firstly diazotising 4-acetylamino-2-aminobenzene sulphonic acid and coupling in acid conditions (pH of 2) onto a hydroxynaphthylamine of the formula

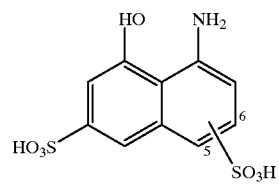

and secondly diazotising 2-aminonaphthalene-1,5-disulphonic acid and coupling in neutral conditions (pH of 7) onto the hydroxynaphthylamine. Thereafter, removal of the acetyl protecting group of the amino group meta to the azo linkage yields the disazo dye of the formula (V).

Although dye formulae have been shown in the form of their free acid in this specification, the invention also includes dyes and processes using dyes in the salt form, particularly their salts with alkali metals such as the potassium, sodium, lithium or mixed sodium/lithium salt.

The dyes may be used for dyeing, printing or ink-jet printing, for example, of textile materials and paper.

The process for colouration is preferably performed at a pH of 7.1 to 13, more preferably 10 to 12. pH levels above 7 can be achieved by performing the process for colouration in the presence of an acid-binding agent.

The substrate may be any of a textile material, leather, paper, hair or film, but is preferably a natural or artificial textile material containing amino or hydroxyl groups, for example textile material such as wool, silk, polyamides and modified polyacrylonitrile fibres, and more preferably a cellulosic textile material, especially cotton, viscose and regenerated cellulose, for example, that commercially available as Tencel. For this purpose the dyes can be applied to the textile materials at a pH above 7 by, for example, exhaust dyeing, padding or printing. Textile materials are coloured bright shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid-binding agent.

Preferred acid-binding agents include alkali metal carbonates, bicarbonates, hydroxides, metasilicates and mixtures thereof, for example, sodium bicarbonate, sodium carbonate, sodium metasilicate, sodium hydroxide and the corresponding potassium salts. The dyes benefit from excellent build-up and high fixation.

At least for cellulosic materials, dyeing may be carried out at a temperature of from 80 to 105° C., preferably 85 to 95° C., still more preferably at about 90° C., a somewhat higher temperature as compared with dyeing carried out with conventional monochlorotriazine exhaust dyes which are generally dyed at temperatures of about 80° C. By operating at this temperature, particularly improved migration is obtained.

The new dyes can be applied to textile materials containing amine groups, such as wool and polyamide textile materials, from a neutral to mildly alkaline dyebath. The dyeing process can be carried out at a constant or substantially constant pH, that is to say the pH of the dyebath remains constant or substantially constant during the dyeing process, or if desired the pH of the dyebath can be altered at any stage of the dyeing process.

The dyes may be in liquid or solid form, for example in granular or powdered form.

We find surprisingly that such dyes provide the following advantageous properties:

a) good all-round fastness;
b) exceptionally good build-up, especially at a dyeing temperature of 90° C.;
c) very strong dyeing;
d) exceptionally good robustness to changes in dyeing conditions, especially temperature, pH and, in particular, dyebath liquor to substrate ratio, leading to overall excellent shade reproducibility;
e) good wash off;
f) good fixation;
g) good aqueous solubility; and
h) good compatibility with other dyes of this type.

Especially preferred embodiments of the invention will now be described in more detail with reference to the following Examples in which all parts and percentages are by weight unless otherwise stated. Although preparation and dyeing with any single dye is exemplified, particular advantages can be seen when dyeing with mixtures of dyes.

EXAMPLE 1

An aqueous solution of sodium 4-acetylamino-2-aminobenzenesulphonate (0.75 mole) and sodium nitrite (390 ml 2N) was added to stirred ice (1 kg) containing concentrated hydrochloric acid (150 ml) over 30 minutes maintaining the temperature below 5° C. Excess nitrite was decomposed with 10% sulphamic acid solution. An aqueous solution of the sodium salt of H-acid (0.5 mole in 600 ml) was added slowly to the well-stirred diazonium salt solution over 45 mins below 5° C. at pH 2. The mixture was stirred below 5° C. for 2 h, and then allowed to warm to room temperature overnight. The intermediate (A) was screened off and dried to a damp paste at 40° C.

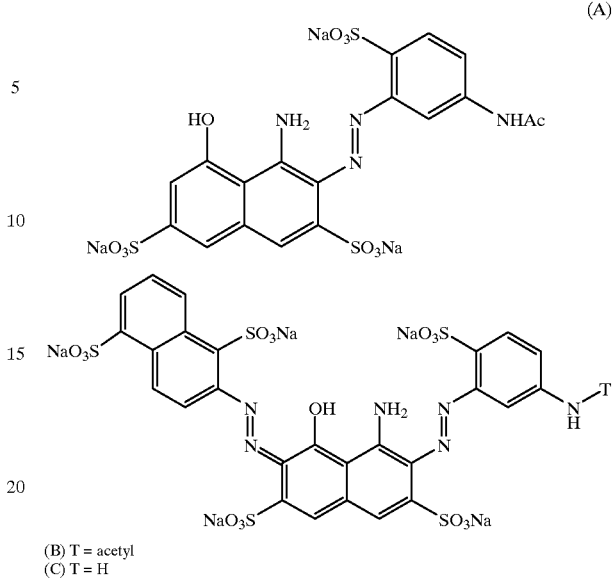

(B) T = acetyl
(C) T = H
(D) T = 2,4-dichloro-1,2,5-triazin-6-yl
Ac = acyl

An aqueous solution of sodium 2-aminonaphthalene-1,5-disulphonate (0.12 mole in 200 ml water) and sodium nitrite (60 ml 2N) was added to stirred ice (200 g) containing concentrated hydrochloric acid (30 ml) over 30 minutes maintaining the temperature below 5° C. Stirring was continued for a further 30 mins when excess nitrite was decomposed with 10% sulphamic acid solution. Intermediate (A) (ca 0.1 mole) in water (800 ml) was treated with sufficient concentrated NaOH solution to ensure solution and cooled to below 5° C. This was added in a steady stream to the diazonium solution below 5° C. whilst the pH gradually rose to 4 when coupling commenced. After 2 h at pH 4 below 5° C. the pH was raised to 7 and the solution stirred overnight whilst warming to room temperature. The solution was filtered, the filtrate concentrated, and treated with methylated spirit to precipitate intermediate (B). This could be purified by redissolving in water and re-precipitating.

The protecting acetyl group was removed from intermediate (3) (0.1 mole) by hydrolysis with KOH (112 g) in aqueous solution at 55° C. for 2.5 h. The alkaline solution was neutralised with hydrochloric acid and concentrated to give successive crops of deacetylated intermediate (C). This (0.0262 mole) was dissolved in water (600 ml) and cooled to below 5° C. and then treated with excess cyanuric chloride (5.08 g; 0.0275 mole) dissolved in acetone. The well-stirred mixture was maintained at pH 6–6.5 for 2 h, after which insolubles were filtered off. The filtrate (containing 0.0131 mole dye (D)) was stirred with ethylenediamine (0.4 g; 0.00655 mole) overnight at pH 10. The pH was then adjusted to 7 and the reaction mixture concentrated. Addition of methylated spirit precipitated the product (1; below) as a blue powder, which could be purified by dialysis. As can be seen from Table 1, this had $\lambda_{max}$=616 nm, $\epsilon_{max}$=86500, ½-band width (HBW)=117nm, and dyed cotton a greenish-navy shade with excellent all-round fastness properties.

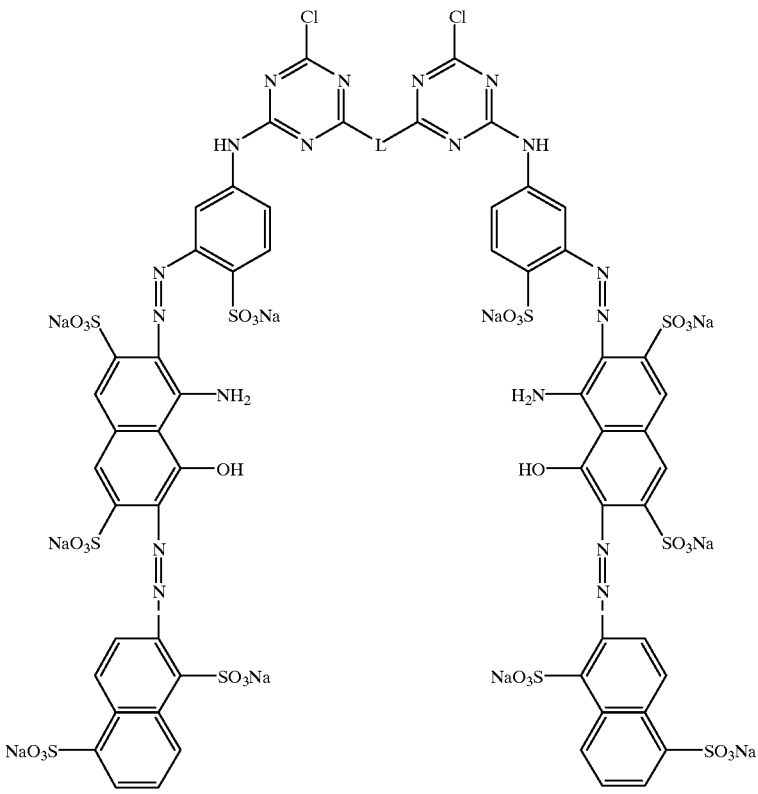

(1) L = NHC₂H₄NH

EXAMPLES 2–30

By replacing the ethylenediamine of Example 1 by an alternative diamine or mercaptoalkylamine, $LH_2$, analogues of (1) differing in the nature of the linking group, L, have also been prepared, as listed in Table 1.

TABLE 1

| Example number | L in structure (1) | Shade on cotton | $\lambda_{max}$ nm | $\epsilon_{max}$ | HBW nm |
|---|---|---|---|---|---|
| 1 | NHC₂H₄NH | greenish navy | 616 | 86,500 | 117 |
| 2 | 1,3-NHC₆H₄NH | greenish navy | 616 | 83,200 | 123 |
| 3 | ⌬N(piperazine)NC₂H₄NH | greenish navy | 613 | 91,000 | 117 |
| 4 | NHC₃H₆NH | greenish navy | 617 | 91,100 | 116 |
| 5 | NHCH(Me)CH₂NH | greenish navy | 615 | 88,900 | 114 |
| 6 | NHC₂H₄N(Me) | greenish navy | 616 | 82,700 | 117 |
| 7 | NHC₃H₆N(Me) | greenish navy | 616 | 100,200 | 112 |
| 8 | NHCH₂CH(OH)CH₂NH | greenish navy | 616 | 91,500 | 114 |
| 9 | 1,4-NHC₆H₄N(Me) | greenish navy | | | |
| 10 | 1,4-NHC₆H₄CH₂NH | greenish navy | 616 | 88,200 | 109 |
| 11 | pyrrolidine-3-NH | greenish navy | 616 | 83,900 | 117 |
| 12 | NHC₂H₄N(C₂H₄OH) | greenish navy | 616 | 89,900 | 116 |
| 13 | NHC(Me)₂CH₂NH | greenish navy | | | |
| 14 | NHC₃H₆N(C₂H₄OH) | greenish navy | 616 | 89,600 | 113 |
| 15 | NHC₂H₄S | greenish navy | 615 | 90,100 | 123 |
| 16 | 1,3-NHC₆H₄CH₂N(Me) | greenish navy | | | |
| 17 | NHC₆H₁₂NH | greenish navy | | | |
| 18 | NHC₂H₄N(C₂H₅) | greenish navy | | | |
| 19 | NHC₃H₆N(Me)C₃H₆NH | greenish navy | 622 | 108,400 | 110 |
| 20 | piperazine | greenish navy | | | |
| 21 | 1,4-NHC₆H₄NH | greenish navy | | | |

TABLE 1-continued

| Example number | L in structure (1) | Shade on cotton | λ$_{max}$ nm | ε$_{max}$ | HBW nm |
|---|---|---|---|---|---|
| 22 | N(Me)C$_2$H$_4$N(Me) | greenish navy | | | |
| 23 | NHC$_2$H$_4$OC$_2$H$_4$NH | greenish navy | | | |
| 24 | ![cyclohexane diamine structure] HN  NH (cyclohexane) | greenish navy | | | |
| 25 | NHC$_3$H$_6$N(C$_3$H$_7$) | greenish navy | | | |
| 26 | N(C$_2$H$_4$OH)C$_2$H$_4$N(C$_2$H$_4$OH) | greenish navy | | | |
| 27 | NHC$_2$H$_4$(OC$_2$H$_4$)$_2$NH | greenish navy | | | |
| 28 | HN-phenyl(SO$_3$H)-NH | greenish navy | | | |
| 29 | HNCH(CO$_2$H)CH$_2$S | greenish navy | | | |
| 30 | N(i-Pr)CH(Me)CH$_2$NH | greenish navy | | | |
| 31 | (Et)NC$_2$H$_4$N(Me) | greenish navy | 616 | 104,700 | 113 |
| 32 | HNC$_2$H$_4$N(C$_3$H$_7$) | greenish navy | 616 | 99,900 | 113 |

EXAMPLES 33–62

Each of the dyes prepared in Examples 1–32 was applied to cotton by exhaust dyeing at 90° C. at a liquor :goods ratio of 10:1 and in the presence of salt and soda ash. In each case, the dye was found to have excellent build-up, extremely high fixation efficiency and good all round fastness properties.

What is claimed is:

1. A dye of the formula (I):

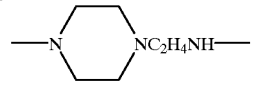

wherein each of D$^1$ and D$^2$ independently is a chromophore of the formula (II)

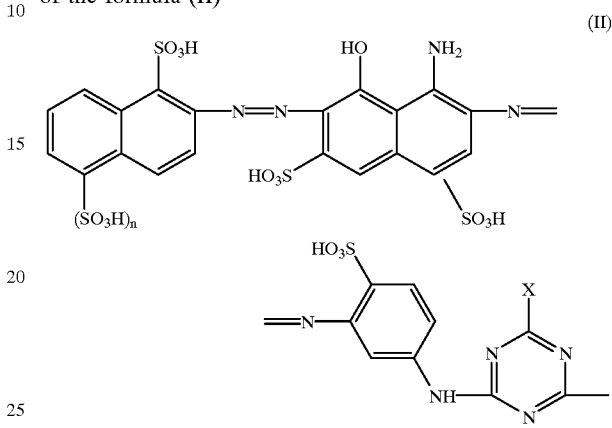

in which X is fluorine, chlorine or optionally substituted pyridinium;

an SO$_3$H is present in the 5- or 6- position of the naphthalene nucleus;

n is zero or 1; and

Y is the group

—N(piperazine)NC$_2$H$_4$NH— or a sulphonic acid salt of the dye of formula (I).

2. The dye according to claim 1, having the formula:

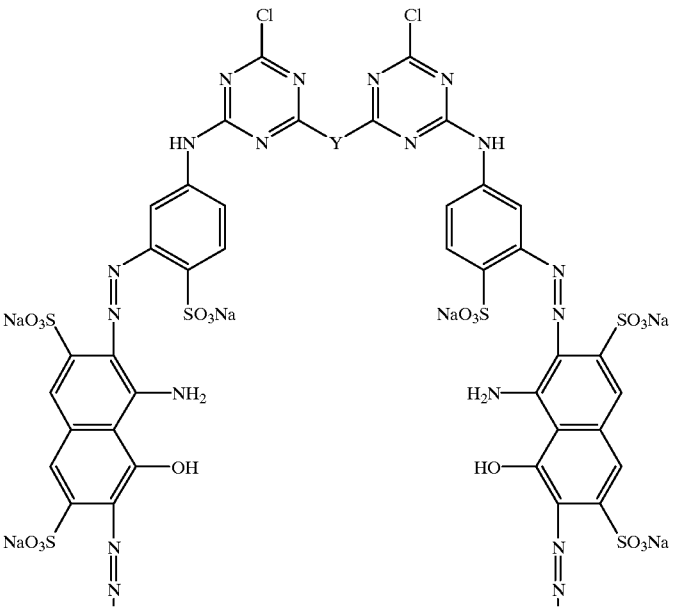

3. A method of preparing a dye of the formula (I) of claim 1, or a sulphonic acid salt thereof, which method comprises allowing at least one reactive disazo dye of the formula (VI):

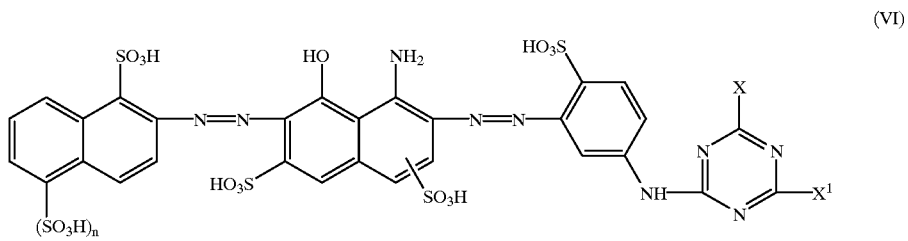

(VI)

wherein X and n are as defined in claim 1 and $X^1$ is a fluorine, chlorine or optionally substituted pyridinium group, to react with a diamine of the formula (III'):

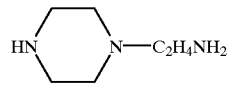

(III')

at a pH of from 7 to 10, in a proportional amount of two moles of reactive disazo dye (VI) per mole of diamine (III').

4. The method according to claim 3, which includes the preliminary step of preparing the reactive disazo dye of the formula (VI) by reacting a disazo dye of the formula (V):

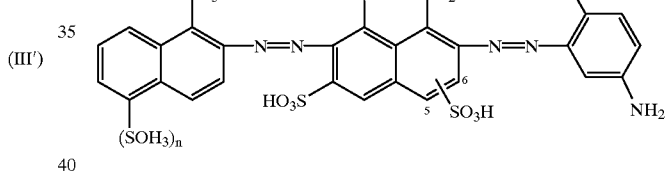

(V)

wherein n is zero or 1, with a triazine of the formula:

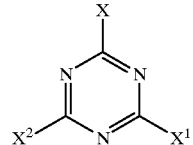

wherein each of X, $X^1$ and $X^2$ independently is chlorine, fluorine or optionally substituted pyridinium.

5. The method according to claim 3, wherein the product is a dye of the formula

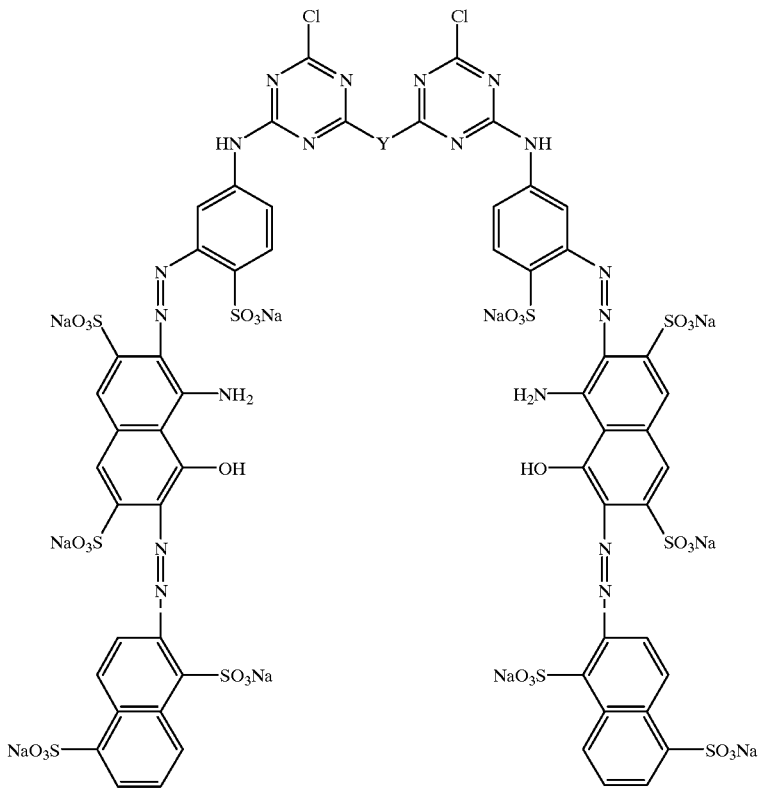

6. A process for the coloration of a substrate, which process comprises applying to the substrate, at a pH above 7, a dye according to claim 1.

7. The process according to claim 6, wherein the dye is applied to the substrate by exhaust dyeing, padding or printing.

8. The process according to claim 7, wherein the dye is applied to the substrate by exhaust dyeing at a temperature of from 80 to 105° C.

9. The process according to claim 8, wherein the exhaust dyeing is carried out at a temperature of 85° C. to 95° C.

* * * * *

UNITED STATES PATENT AND TRADEMARK OFFICE
CERTIFICATE OF CORRECTION

PATENT NO. : 6,359,121 B1  Page 1 of 10
DATED : March 19, 2002
INVENTOR(S) : Warren James Ebenezer, et al.

It is certified that error appears in the above-identified patent and that said Letters Patent is hereby corrected as shown below:

Title page,
Item [57], ABSTRACT,
Formula (II) reads, "                                                                                       "

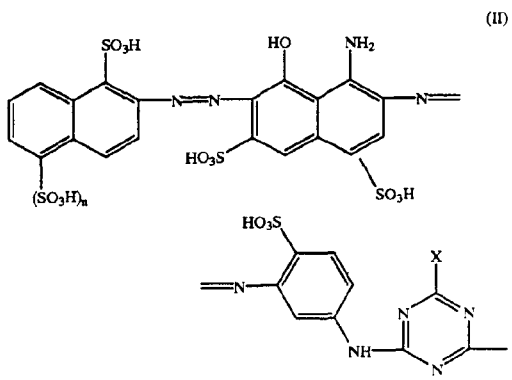

should read  --                                                                                       --.

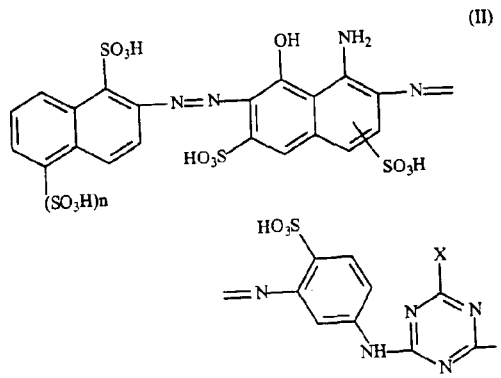

UNITED STATES PATENT AND TRADEMARK OFFICE
CERTIFICATE OF CORRECTION

PATENT NO. : 6,359,121 B1  Page 2 of 10
DATED : March 19, 2002
INVENTOR(S) : Warren James Ebenezer, et al.

It is certified that error appears in the above-identified patent and that said Letters Patent is hereby corrected as shown below:

Column 1,
Line 30, reads "                                                                                                          "

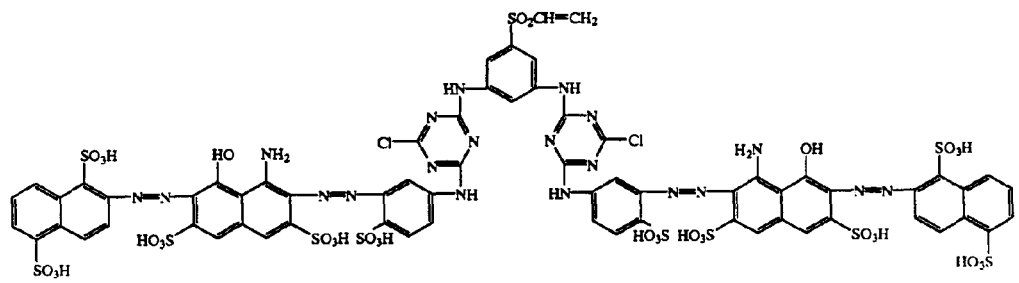

should read --                                                                                                          --

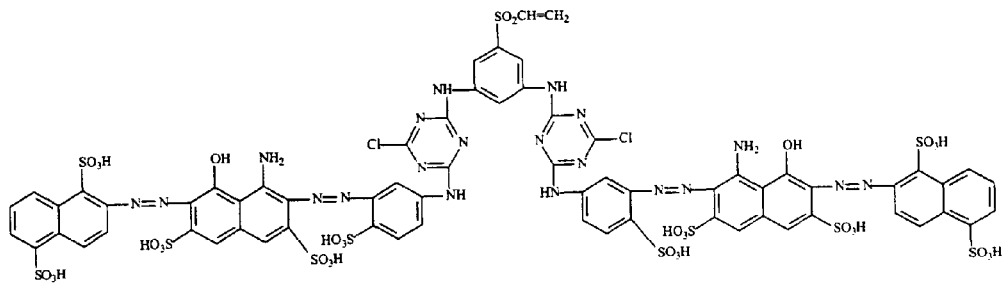

UNITED STATES PATENT AND TRADEMARK OFFICE
CERTIFICATE OF CORRECTION

PATENT NO.       : 6,359,121 B1                                            Page 3 of 10
DATED            : March 19, 2002
INVENTOR(S)      : Warren James Ebenezer, et al.

It is certified that error appears in the above-identified patent and that said Letters Patent is hereby corrected as shown below:

Column 6,
Line 15, "$_{N(CH3)}C_2H_4N(CH_3)$:" should read -- $N(CH_3)C_2H_4N(CH_3)$: --.

Column 7,
Line 20, Formula (II) reads,

"
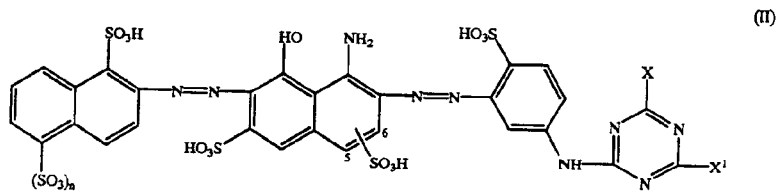
"

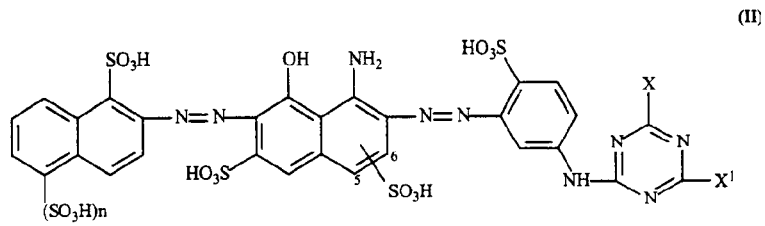

should read --                                                                    --.

UNITED STATES PATENT AND TRADEMARK OFFICE
CERTIFICATE OF CORRECTION

PATENT NO. : 6,359,121 B1
DATED : March 19, 2002
INVENTOR(S) : Warren James Ebenezer, et al.

It is certified that error appears in the above-identified patent and that said Letters Patent is hereby corrected as shown below:

Column 7,
Line 58, Formula (V) reads, "

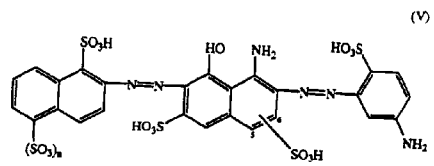

should read --

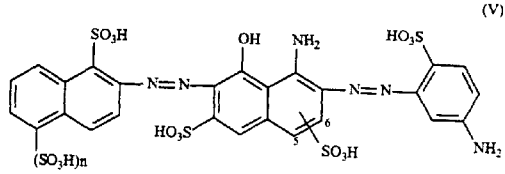

--.

Column 8,
Line 35 reads, "

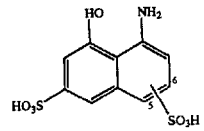

should read --

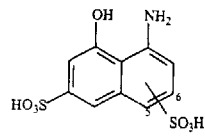

--.

UNITED STATES PATENT AND TRADEMARK OFFICE
CERTIFICATE OF CORRECTION

PATENT NO. : 6,359,121 B1
DATED : March 19, 2002
INVENTOR(S) : Warren James Ebenezer, et al.

It is certified that error appears in the above-identified patent and that said Letters Patent is hereby corrected as shown below:

Column 10,
Line 13 reads, "                                                                              "

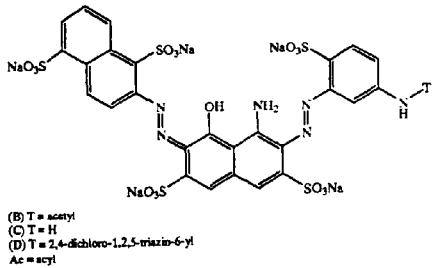

should read --                                                                                 --.

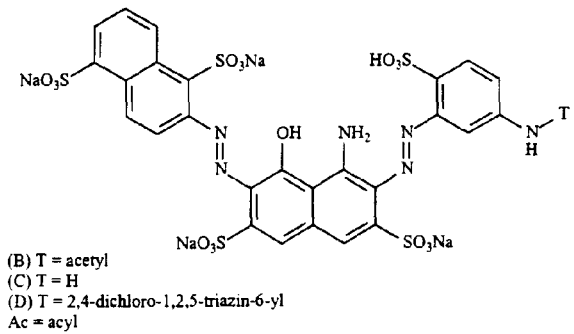

(B) T = acetyl
(C) T = H
(D) T = 2,4-dichloro-1,2,5-triazin-6-yl
Ac = acyl

UNITED STATES PATENT AND TRADEMARK OFFICE
CERTIFICATE OF CORRECTION

PATENT NO. : 6,359,121 B1  Page 6 of 10
DATED : March 19, 2002
INVENTOR(S) : Warren James Ebenezer, et al.

It is certified that error appears in the above-identified patent and that said Letters Patent is hereby corrected as shown below:

Column 11,
Line 1 reads, "

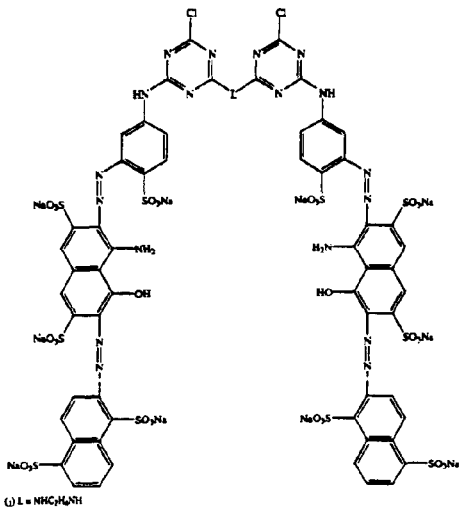

should read --

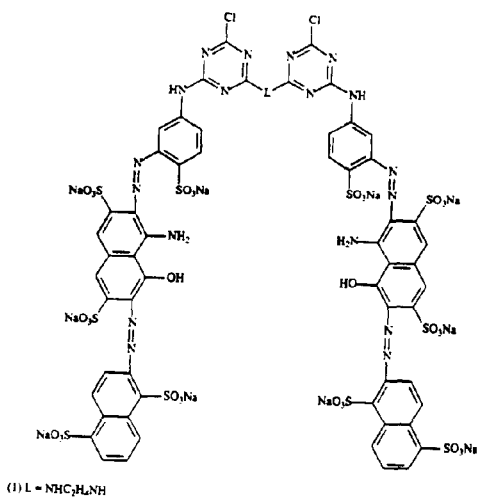

--.

UNITED STATES PATENT AND TRADEMARK OFFICE
CERTIFICATE OF CORRECTION

PATENT NO.    : 6,359,121 B1                                               Page 7 of 10
DATED         : March 19, 2002
INVENTOR(S)   : Warren James Ebenezer, et al.

It is certified that error appears in the above-identified patent and that said Letters Patent is hereby corrected as shown below:

Column 14,
Lines 6 and 7, "1. A dye of the formula (I):"

should read -- 1. A dye of the formula (I):
$$D^1\text{—}Y\text{—}D^2 \quad --;$$

Column 14,
Formula (II) reads, "

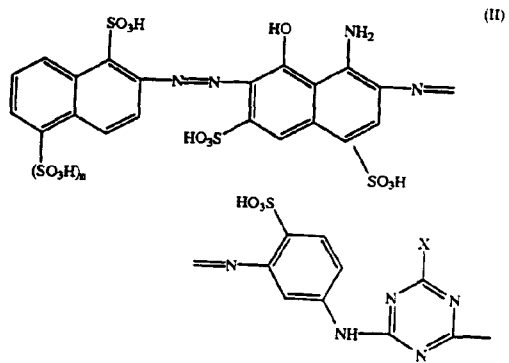

"

should read --

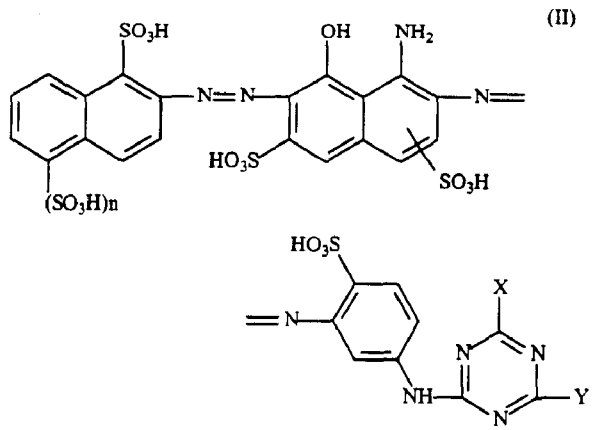

--.

UNITED STATES PATENT AND TRADEMARK OFFICE
CERTIFICATE OF CORRECTION

PATENT NO.   : 6,359,121 B1
DATED        : March 19, 2002
INVENTOR(S)  : Warren James Ebenezer, et al.

It is certified that error appears in the above-identified patent and that said Letters Patent is hereby corrected as shown below:

Column 15,
Formula in claim 2 reads, "

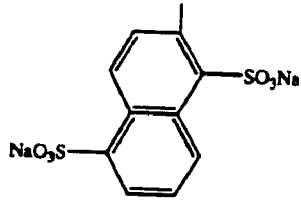
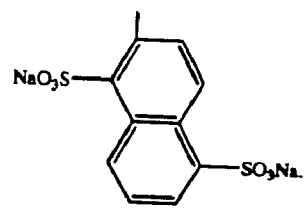

-continued

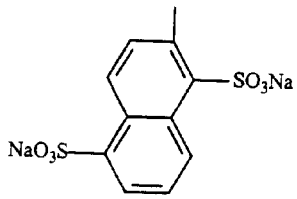
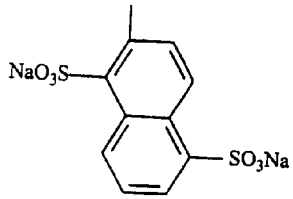

should read --                                                                    --.

UNITED STATES PATENT AND TRADEMARK OFFICE
CERTIFICATE OF CORRECTION

PATENT NO. : 6,359,121 B1
DATED : March 19, 2002
INVENTOR(S) : Warren James Ebenezer, et al.

It is certified that error appears in the above-identified patent and that said Letters Patent is hereby corrected as shown below:

Column 16,
Formula (V) reads,

"
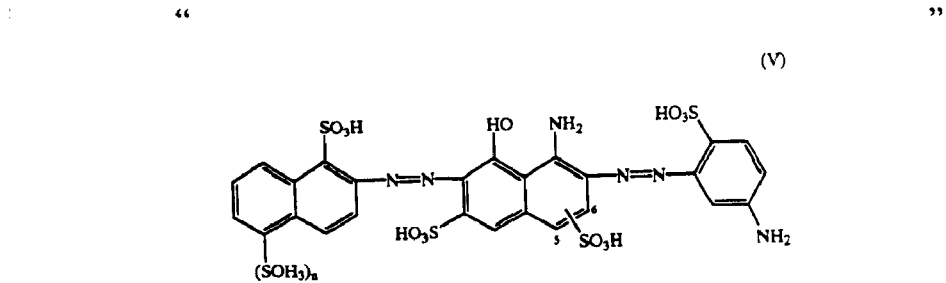
"

should read

--
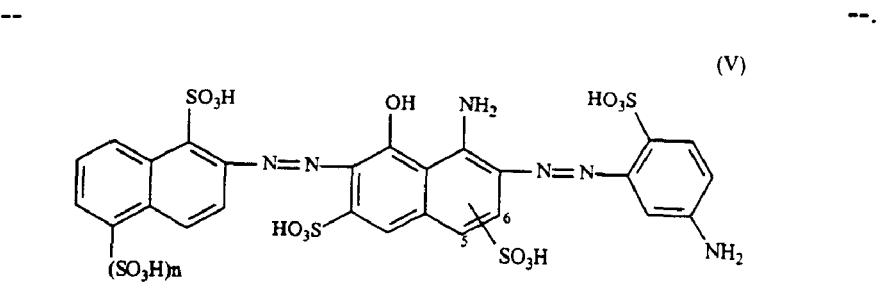
--.

UNITED STATES PATENT AND TRADEMARK OFFICE
CERTIFICATE OF CORRECTION

PATENT NO. : 6,359,121 B1
DATED : March 19, 2002
INVENTOR(S) : Warren James Ebenezer, et al.

Page 10 of 10

It is certified that error appears in the above-identified patent and that said Letters Patent is hereby corrected as shown below:

Column 17,
formula in claim 5 reads, " 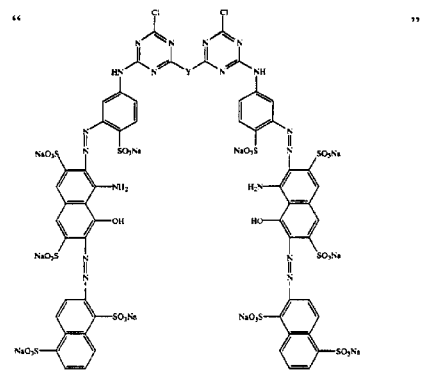 "
--                    --.

should read

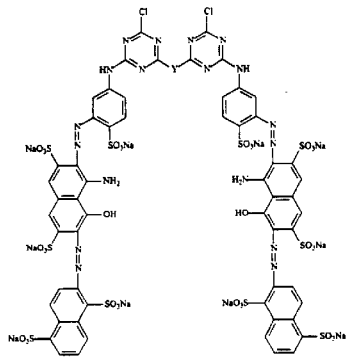

Signed and Sealed this

Eleventh Day of March, 2003

JAMES E. ROGAN
*Director of the United States Patent and Trademark Office*